No. 802,096. PATENTED OCT. 17, 1905.
C. W. DUNTON.
TREE INSULATOR.
APPLICATION FILED MAR. 24, 1905.

2 SHEETS—SHEET 1.

Witnesses:
H. B. Davis
Maud M. Piper

Inventor:
Charles W. Dunton
by Ayres & Harriman
Attys

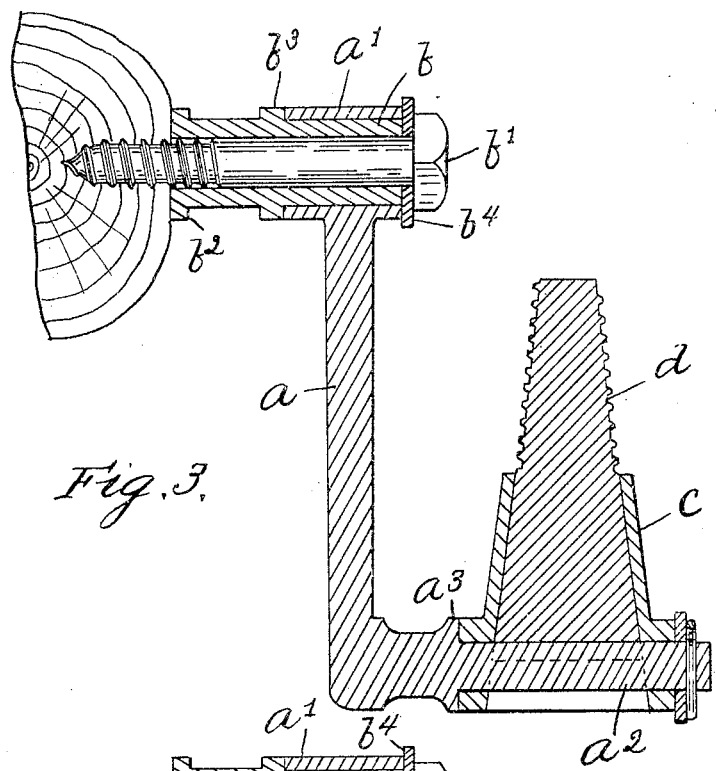
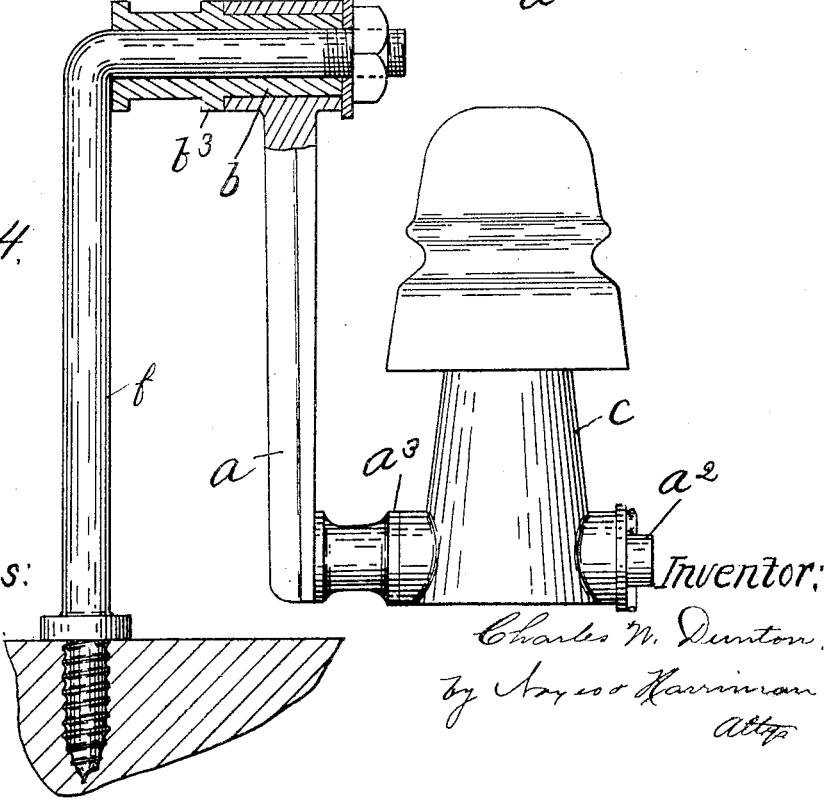

UNITED STATES PATENT OFFICE.

CHARLES W. DUNTON, OF BOSTON, MASSACHUSETTS, ASSIGNOR OF ONE-HALF TO FRANK D. FIELD, OF CAMBRIDGE, MASSACHUSETTS.

TREE-INSULATOR.

No. 802,096.  Specification of Letters Patent.  Patented Oct. 17, 1905.

Application filed March 24, 1905. Serial No. 251,757.

*To all whom it may concern:*

Be it known that I, CHARLES W. DUNTON, of Boston, county of Suffolk, State of Massachusetts, have invented an Improvement in Tree-Insulators, of which the following description, in connection with the accompanying drawings, is a specification, like characters on the drawings representing like parts.

This invention relates to tree-insulators for electric wires, and has for its object to provide a device adapted to be attached to a tree, which is constructed and arranged to support the ordinary insulator-pin and insulator to which an electric-wire is connected by the usual tie-wire, and to allow free movement of the attaching means or point of attachment of the device relative to the insulator within prescribed limits, the range of movement being sufficient to compensate for the swaying of the tree or limb thereof to which the device is attached.

The invention comprehends, essentially, a swinging arm, means for attaching it to the tree, and a support—as, for instance, an insulator-pin—loosely connected to the extremity of said arm, bearing means, as an insulator, for holding an electric wire.

Figure 1:
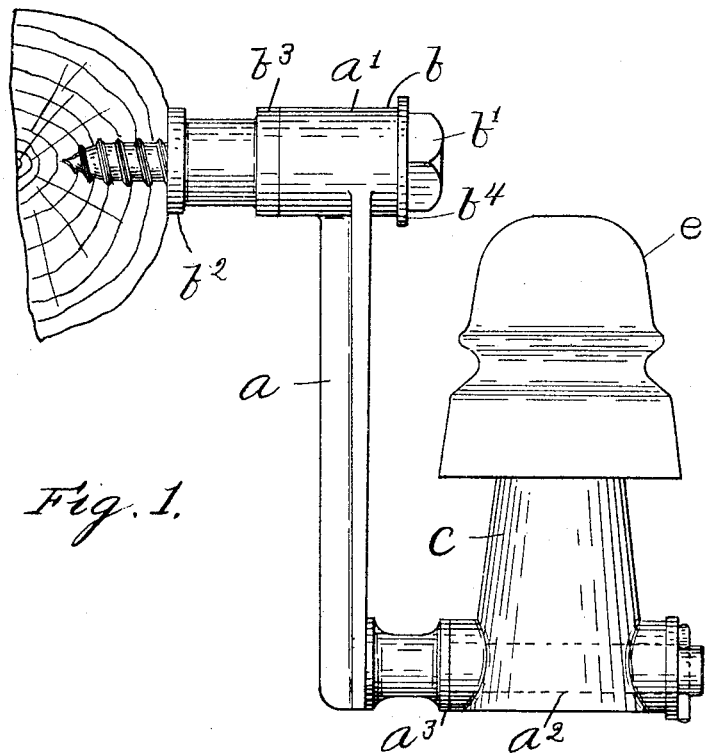
Figure 2:
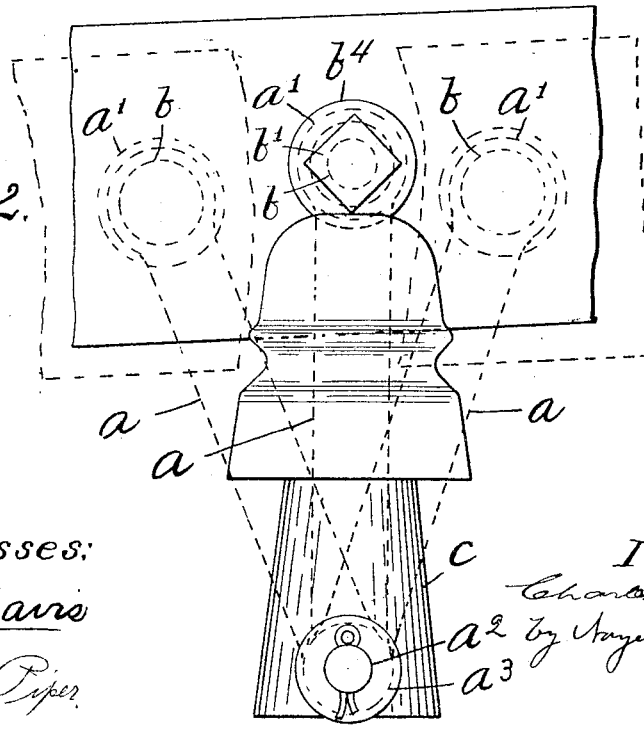

Figure 1 shows in side elevation a tree-insulator embodying this invention. Fig. 2 is a front elevation of the tree-insulator shown in Fig. 1, the dotted lines representing the attaching means in two different positions. Fig. 3 is a vertical section of the tree-insulator shown in Fig. 1. Fig. 4 shows a modified form of attaching means for the tree-insulator.

$a$ represents an arm, which is made of any suitable length, having at its upper end a hub $a'$, mounted to turn freely on a bushing $b$, through which passes a screw $b'$, which is screwed into the tree. The bushing $b$ is held fast to the tree by the screw and is formed or provided at its inner end adjacent the tree with a flange $b^2$ and also with a similar flange $b^3$ next the hub, or, if desired, said flange $b^3$ may be omitted. To prevent the hub from sliding off the bushing, a suitable washer $b^4$ is interposed between the end of the bushing and the head of the screw. The arm $a$ depends from the bushing and is free to swing on said bushing as a pivot. The lower end of the arm $a$ has a horizontal extension $a^2$ of cylindrical form projecting from it at right angles, which is formed or provided with a flange $a^3$ at its inner end. A hollow frusto-conical body or shell $c$, having two oppositely-disposed holes through its wall near its lower end, is mounted on the cylindrical extension of the arm $a$, said extension passing through said holes. Hence the conical shell $c$ is free to turn on said cylindrical extension as a pivot.

An insulator-pin $d$, of wood, comprises the usual screw-threaded stem rising from a conical base, and the conical base thereof is fitted into the hollow frusto-conical body $c$, which serves as a support for it and is held therein by the cylindrical portion $d^2$, which crosses its lower end diametrically. The lower end of the conical base of the insulator-pin is preferably formed with a groove extending diametrically across it, which receives said cylindrical extension $a^2$, and thus prevents the insulator-pin from turning.

The usual glass insulator $e$ of any suitable form is screwed onto the insulator-pin, and the electric wire will be tied to this insulator in any usual manner. The insulator-pin $d$ and support therefor serve as a support for the insulator, and said insulator serves as a means of holding the electric wire.

It will be seen that the lower end of the arm $a$ is free to turn in the support for the insulator-pin on a horizontal axis, and the upper end of said arm, which is attached to the tree, is also free to turn on a horizontal axis, and as a result the upper end of the arm or the attaching means is free to move within prescribed limits, yet the range of movement is sufficient to compensate for the swaying of the tree or limb thereof to which the device is attached.

The bushing bearing the swinging arm may be mounted upon one arm of an L-pin, as $f$, (see Fig. 4,) which is screwed into the top of a limb if it should be required to thus attach the device to the tree. In other words, either form of attaching means may be employed, according to the requirements.

Having thus described my invention, what I claim as new, and desire to secure by Letters Patent, is—

1. In a tree-insulator, a swinging arm, means for attaching it to a tree, a support pivoted at its lower end to the extremity of said arm bearing means for holding an electric wire, substantially as described.

2. In a tree-insulator, a swinging arm, means for attaching it to a tree, an insulator-support pivoted at its lower end to the lower end of said arm adapted to receive upon it an insulator, substantially as described.

3. In a tree-insulator, a swinging arm, means for attaching it to a tree, and an insulator-pin supported at the lower end of said arm adapted to receive upon it an insulator, substantially as described.

4. In a tree-insulator a swinging arm having an extension at its lower end projecting therefrom at right angles, means for attaching it to a tree, a support loosely mounted on said extension bearing means for holding an electric wire, substantially as described.

5. In a tree-insulator, a swinging arm having an extension at its lower end projecting therefrom at right angles, means for attaching it to a tree, an insulator-support on said extension and an insulator thereon, substantially as described.

6. In a tree-insulator, a swinging arm, means for attaching it to a tree, and an insulator-pin loosely supported at the lower end of said arm, adapted to receive an insulator, substantially as described.

7. In a tree-insulator, a bushing, a screw extended therethrough for attaching it to a tree, a swinging arm having a hub loosely mounted on said bushing, and an insulator located at the lower end of said swinging arm, substantially as described.

8. In a tree-insulator, an arm, means for attaching it to a tree, an extension formed at the lower end of and at right angles to said arm, an insulator-pin, and a support therefor loosely mounted on said extension, substantially as described.

9. In a tree-insulator, an arm, means for attaching it to a tree, an extension formed at the lower end of and at right angles to said arm, an insulator-pin having a conical base, and a hollow frusto-conical body containing said insulator-pin, loosely mounted on said extension, substantially as described.

10. In a tree-insulator, an arm, means for attaching it to a tree, an extension formed at the lower end of and at right angles to the arm, a hollow frusto-conical body having two oppositely-disposed holes through it, for said extension, and an insulator-pin having a conical base which is contained in said hollow body, above said extension, substantially as described.

11. In a tree-insulator, an arm, means for attaching it to a tree, an extension formed at the lower end of and at right angles to the arm, a hollow frusto-conical body having two oppositely-disposed holes through it for said extension, and an insulator-pin having a conical base formed with a groove extending diametrically across its lower end, which is contained in said hollow body above said extension, substantially as described.

12. In a tree-insulator, a swinging arm, means for attaching it to a tree, an insulator-pin, and means for supporting said pin pivoted to the extremity of said arm, substantially as described.

In testimony whereof I have signed my name to this specification in the presence of two subscribing witnesses.

CHARLES W. DUNTON.

Witnesses:
B. J. NOYES,
H. B. DAVIS.